(12) United States Patent
McCracken

(10) Patent No.: US 10,226,689 B2
(45) Date of Patent: Mar. 12, 2019

(54) GAME AND METHOD OF PLAYING A GAME

(71) Applicant: LANDVITI LLC, Sand Lake, NY (US)

(72) Inventor: Robert McCracken, Sand Lake, NY (US)

(73) Assignee: Landviti LLC, Sand Lake, NY (US)

(*) Notice: Subject to any disclaimer, the term of this patent is extended or adjusted under 35 U.S.C. 154(b) by 136 days.

(21) Appl. No.: 14/915,000

(22) PCT Filed: Aug. 28, 2014

(86) PCT No.: PCT/US2014/053243
§ 371 (c)(1),
(2) Date: Feb. 26, 2016

(87) PCT Pub. No.: WO2015/031665
PCT Pub. Date: Mar. 5, 2015

(65) Prior Publication Data
US 2016/0206953 A1     Jul. 21, 2016

Related U.S. Application Data

(60) Provisional application No. 61/871,128, filed on Aug. 28, 2013.

(51) Int. Cl.
*A63F 3/00* (2006.01)
*A63F 3/04* (2006.01)
(Continued)

(52) U.S. Cl.
CPC .................. *A63F 3/04* (2013.01); *A63F 3/00* (2013.01); *A63F 3/0457* (2013.01); *G09B 5/065* (2013.01);
(Continued)

(58) Field of Classification Search
CPC .......................... A63F 3/00; A63F 2003/00457
See application file for complete search history.

(56) References Cited

U.S. PATENT DOCUMENTS

| | | | | |
|---|---|---|---|---|
| 4,856,787 A | * | 8/1989 | Itkis | G07F 17/32 273/237 |
| 6,315,660 B1 | * | 11/2001 | DeMar | G07F 17/32 273/138.2 |
| 2004/0041344 A1 | * | 3/2004 | Thomson | A63F 3/00574 273/241 |

OTHER PUBLICATIONS

Hesse, Hermann, Excerpt from *Magister Ludi (The Glass Bead Game)*, 1978. Downloaded May 23, 2017, from https://ia800405.us.archive.org-20-items-MagisterLudi-TheGlassBeadGame-HermanHesse-hesseludi.pdf. (20 Pages).

* cited by examiner

*Primary Examiner* — Omkar Deodhar
(74) *Attorney, Agent, or Firm* — McCracken & Gillen LLC

(57) ABSTRACT

A game and a method of playing the game are disclosed. The game comprises a board having a domain region and a plurality of theme regions. Each theme region is associated with a theme. The game also provides each player with a plurality of game pieces, and each game piece of the plurality of game pieces is associated with an identifier. Each information bearing member of a plurality of information bearing members is associated with a theme and an identifier. Placing one game piece of the plurality of game pieces in one of the theme regions causes one of the plurality of information bearing members to be selected in accordance with the identifier associated with the placed game pieces and the theme associated with theme region in which such game piece was placed. Information specified by the selected information bearing member is presented to all of the players.

22 Claims, 8 Drawing Sheets

(51) Int. Cl.
  *G09B 5/06* (2006.01)
  *G09B 19/00* (2006.01)
  *G09B 19/02* (2006.01)
(52) U.S. Cl.
  CPC ......... *G09B 19/00* (2013.01); *G09B 19/0046* (2013.01); *G09B 19/0061* (2013.01); *G09B 19/025* (2013.01); *A63F 2003/00719* (2013.01); *A63F 2003/00722* (2013.01); *A63F 2003/00738* (2013.01); *A63F 2003/00996* (2013.01)

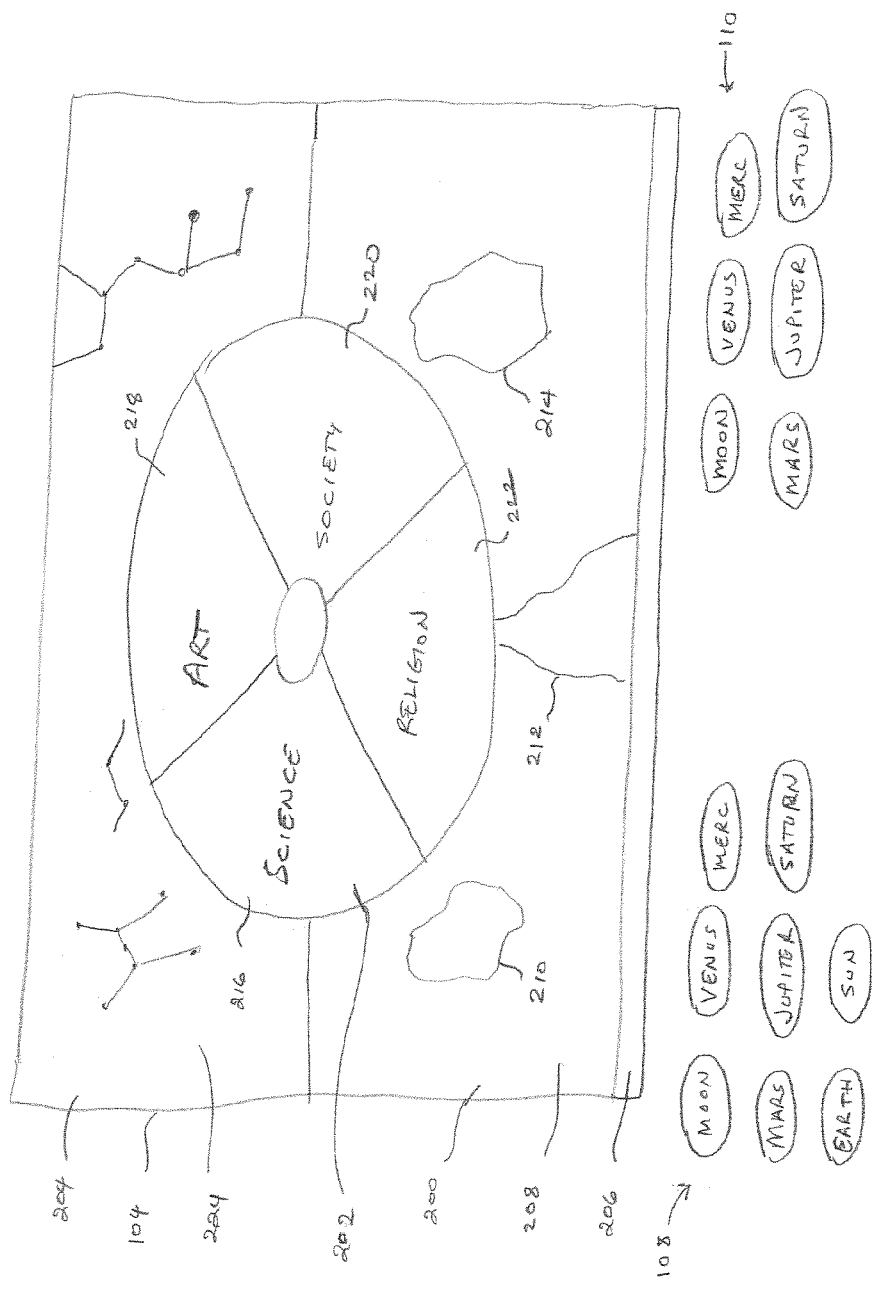

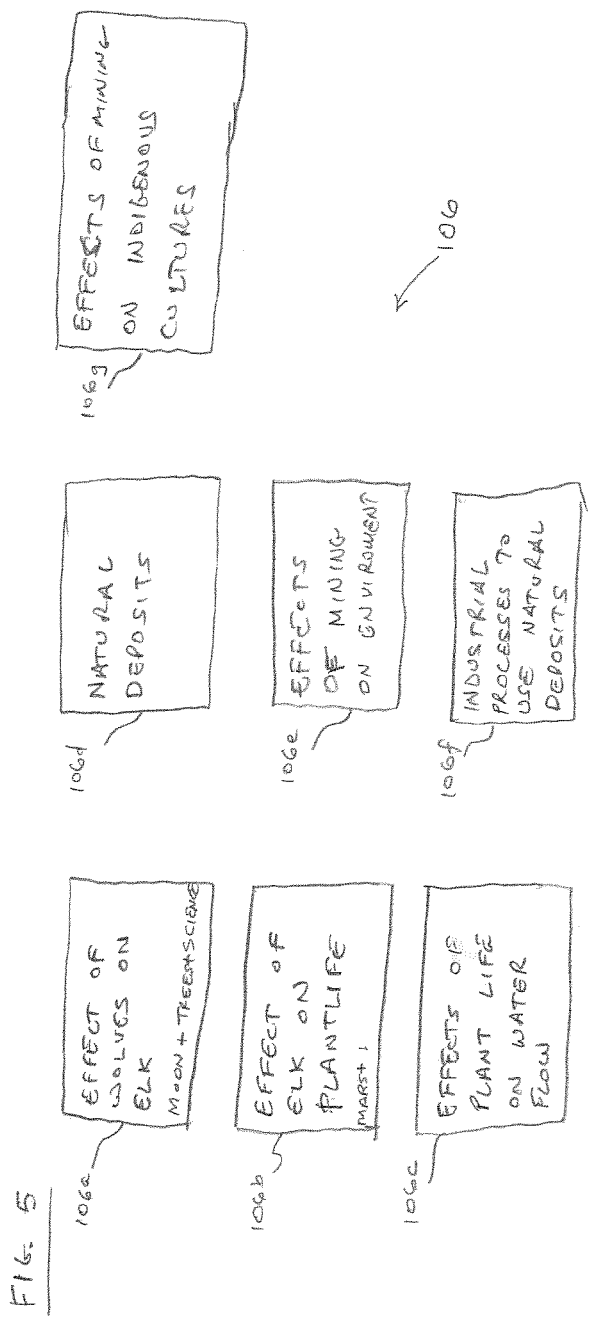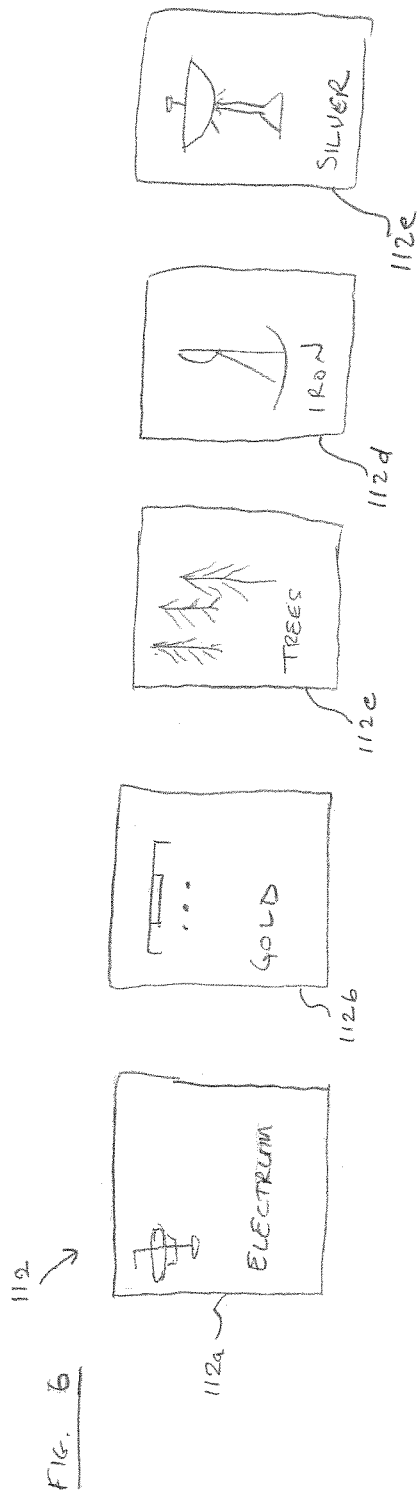

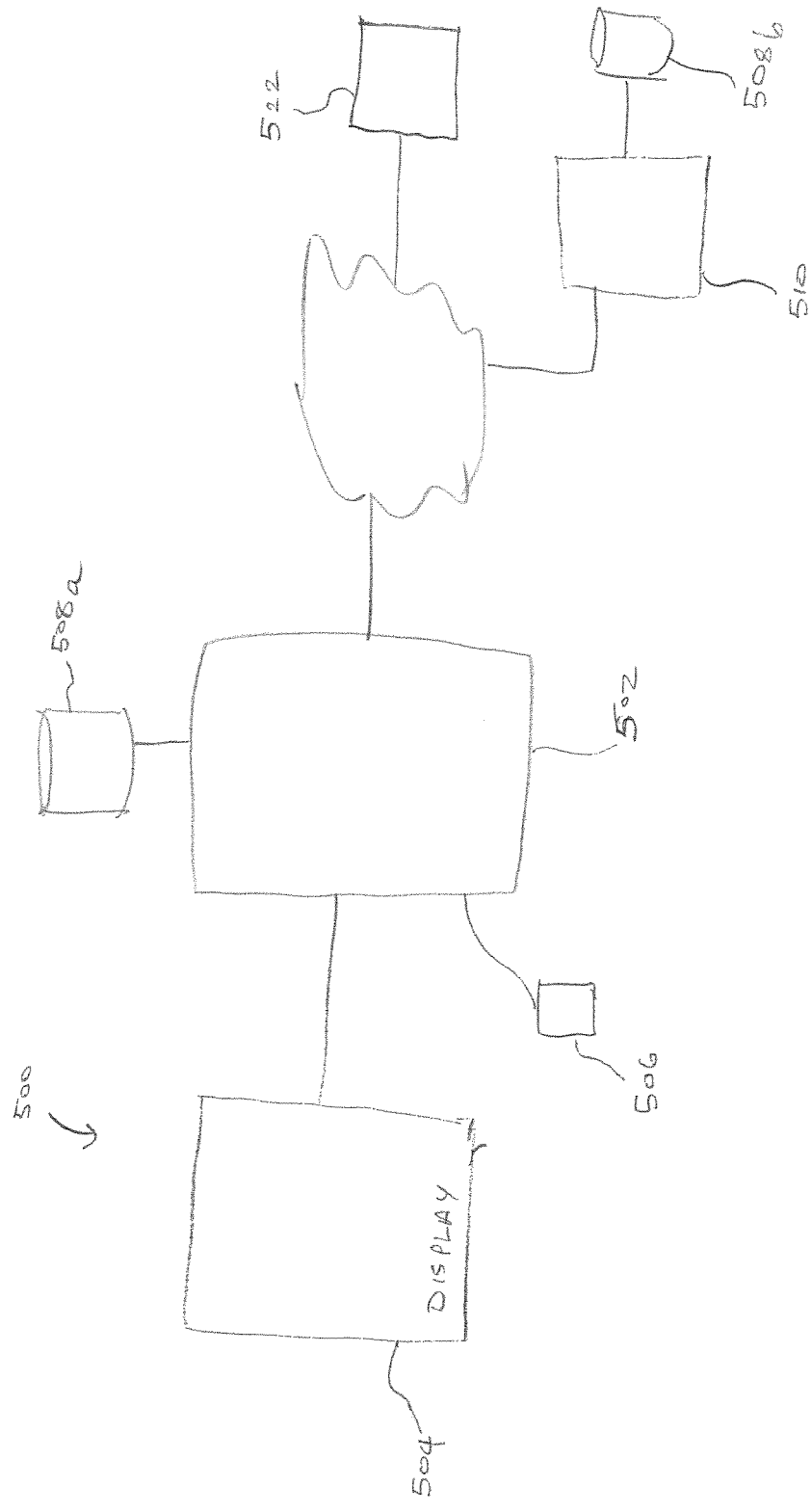

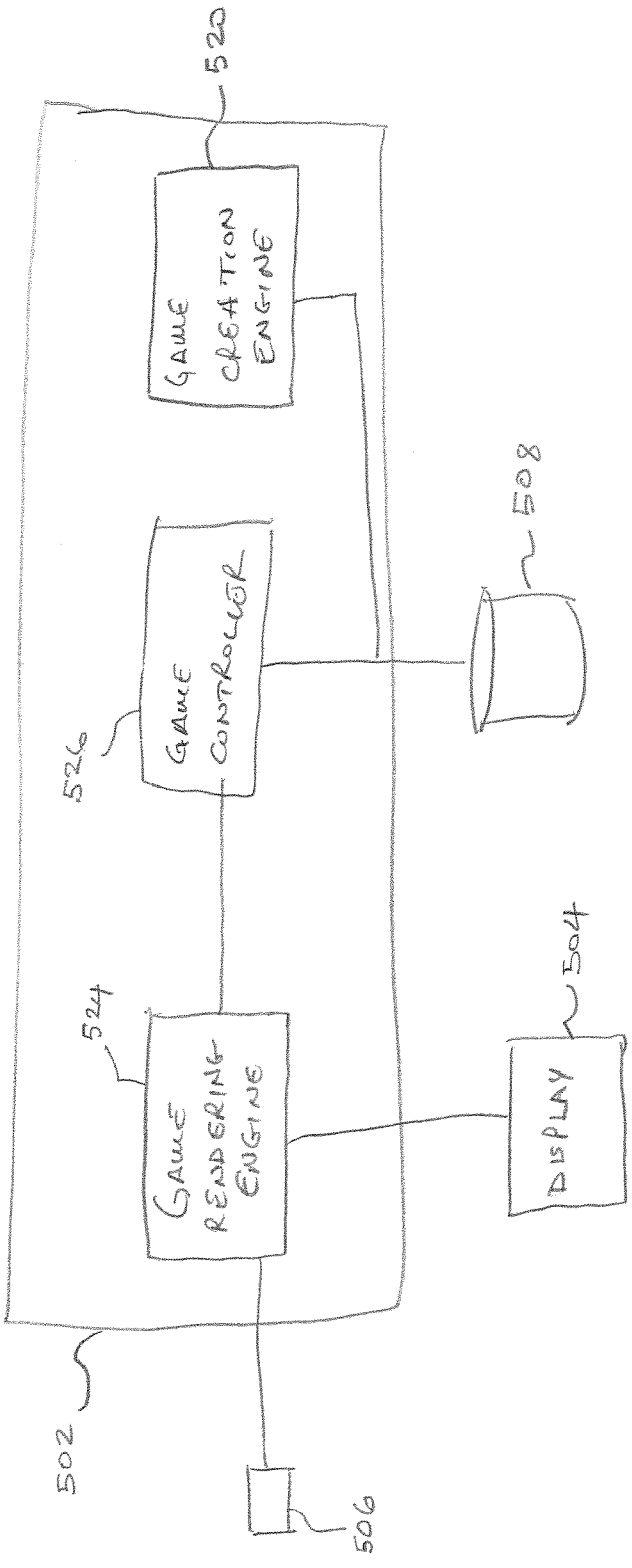

GAME AND METHOD OF PLAYING A GAME

CROSS REFERENCE TO RELATED APPLICATIONS

The present application claims the benefit of McCracken, U.S. Provisional Patent Application Ser. No. 61/871,128, filed Aug. 28, 2013, and entitled "Game." The entire contents of this application are incorporated herein by reference.

FIELD OF DISCLOSURE

The present subject matter relates to a game, and more particularly, to a game to facilitate teaching.

BACKGROUND

Games are played for many reasons including testing a skill, entertaining, facilitating discussion, teaching a subject, and/or a combination thereof. Games typically have rules of play and some games specify particular achievements to identify a winner of the game. For example, the winner may be the player who follows the rules of the game to move, before other players can, a predetermined number of tokens to a particular location on a game board. In other games, the winner of a game is the player who follows the rules to obtain more tokens than other players.

Games do not always have a winner at the end of game play. For example, a game may have rules that allow players to explore or experience different topics or situations. Such games may be useful for pedagogical purposes. Students may play such a game to explore a topic from different perspectives. A teacher or other content developer may provide the instructional material associated with the topic, and the students may follow the rules of the game to explore such instructional material. Further, a teacher or other game master may facilitate the exploration within the context of the game rules.

SUMMARY

According to one aspect, a game includes a board, a plurality of game pieces for each player, and a plurality of information bearing members. The board has a domain region and a plurality of theme regions, and each theme region is associated with a theme. Each game piece of the plurality of game pieces is associated with an identifier, and each information bearing member of the plurality of information bearing members is associated with a theme and an identifier. Placing one of the plurality of game pieces in one of the theme regions causes one of the plurality of information bearing members to be selected in accordance with the identifier associated with the placed game piece and the theme associated with theme region in which such game piece was placed, and wherein information specified by the selected information bearing member is presented to all of the players.

According to another aspect, a method of playing a game includes the steps of providing a board and a plurality of game pieces to each player. The board has a domain region and a plurality of theme regions, and each theme region is associated with a theme. An identifier is associated with each game piece of the plurality of game pieces. The method includes the further steps of associating each one of a plurality of information bearing members with a theme and an identifier, and placing one of the plurality of game pieces in one of the theme regions. In addition, the method includes the steps of selecting one of the plurality of information bearing members in accordance with the identifier associated with the placed game piece and the theme associated with theme region in which such game piece is placed, and presenting information specified by the selected information bearing member to players of the game.

Other aspects and advantages will become apparent upon consideration of the following detailed description and the attached drawings wherein like numerals designate like structures throughout the specification.

BRIEF DESCRIPTION OF THE DRAWINGS

FIGS. 3 and 4 are a top planar views of a board and game pieces used in the game;

FIG. 5 is a top planar view of information bearing members used in the game;

FIG. 6 is a top planar view of symbol tokens used in the game;

FIG. 10 is a block diagram of a system that may be used to play the game;

FIG. 11 is a further block diagram of the system of FIG. 10; and

DETAILED DESCRIPTION

Figure 2:
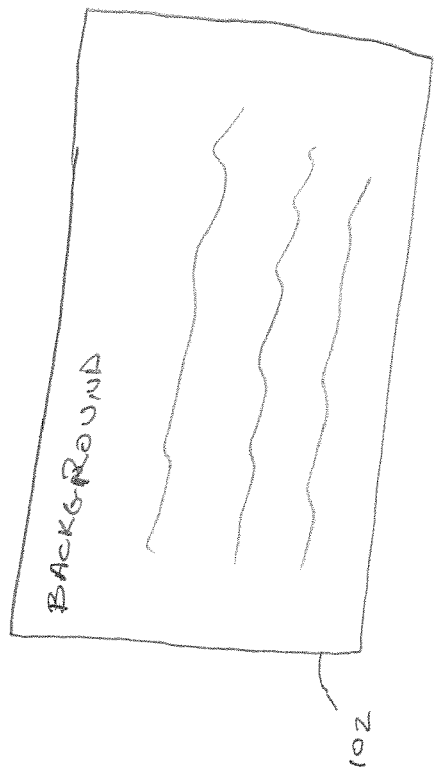
FIG. 2 is a top planar view of a background bearing member using in the game.

Referring to FIGS. 1-6, a game includes an explanation bearing member or explanation card 100, a background bearing member or background card 102, a game board 104, and a plurality of information bearing members or content cards 106. In addition, the game includes a plurality of game pieces 108 such as beads used by a game master, a plurality of game pieces 110 such as beads used by a player, and a plurality of the symbol tokens 112. All of the plurality of beads 108 used by the game master may be, for example, a particular color. Each player may use the plurality of beads 110 that are all of another color, wherein the another color is associated with the player. In this fashion, the plurality of beads 110 used by each player may be distinguished from those used by other players, and the plurality of beads 108 used by the game master. In some embodiments, all of the pluralities of beads 110 used by the players are the same color, but unique indicia are used to distinguish the plurality of beads 110 used by one player from the beads used by another player. For example, each plurality of beads 110 used by a particular player may have a unique indicium thereon that is associated with the particular player. Such indicium may be a symbol, an avatar, or other indicium apparent to one who has skill in the art.

Associated with each bead 110*a*, 110*b*, . . . , 110*f* of the plurality of beads 110 used by a player is a unique identifier (e.g., a pattern, name, indicia, and/or characteristic). Similarly, the plurality of beads 108 used by the game master includes a bead 108*a*, 108*b*, . . . , 108*f* associated with each identifier. In a typical game, the game master has eight beads 108 and each player has six beads 110. For example, in one embodiment, the identifiers are selected from celestial bodies and are identified by a name of a celestial body. In one such embodiment, the identifiers are "Moon," "Venus," "Mercury," "Mars," "Jupiter," and "Saturn." Each plurality of beads 108 and 110 includes a bead that is associated with one of the identifiers. The plurality of beads 108 used by the game master include two additional beads 108g and 108h, which have unique identifiers associated therewith. For example, if celestial bodies are used to identify the beads, the plurality of beads 108 includes the beads 108g and 108h identified by "Earth" and "Sun," respectively. It should be apparent that other types of identifiers, for example, mythological creatures, metals, continents, and the like may be used to identify individual ones of the plurality of beads 108 and 110.

Before the game may be played, a content developer (who also may be the game master) selects a domain for the game. The domain is the general topic the players and the game master will explore by playing the game. Domains may include, for example, a place (Yellowstone Park, the Moon, the Pacific Ocean, etc.), a scientific concept (algebra, physics, gravity, etc.), an event (discovery of the Americas, World War II, first landing on the Moon, etc.) and the like. In some cases, the content developer may identify sub-domains associated with a domain. For example, if the domain is Yellowstone Park, the content developer may identify sub-domains that include Yellowstone Lake, Geysers, Caldera, and the like. Sub-domains that may be appropriate for other domains will be apparent to those of skill in the art. A game may be played to explore either the domain or the sub-domain. In the following, the terms domain and sub-domain are used interchangeably unless noted otherwise.

The content developer associates symbol tokens 112 (FIG. 6) with particular aspects of the domain that may be explored with the game. For example, a symbol token "Electrum" 112a may be associated the natural world, a symbol token "Gold" 112b may be associated with industry, a symbol token "Trees" 112c may be associated with nature, a symbol token "Iron" 112d may be associated with human activity, and a symbol token "Silver" 112e may be associated with wealth. The content developer may develop additional symbol tokens 112 and associate such tokens with other aspects that may be explored.

The content developer further populates the content cards 106 with information associated with a domain and/or sub-domain. In particular, each content card 106 may be associated with a bead identifier, a symbol token, and a theme. In one embodiment, the game may include the themes "Art," "Science," "Religion," and "Society." For example, the content cards shown in FIG. 5 have the following associations:

| Card | Information | Bead | Symbol | Theme |
| --- | --- | --- | --- | --- |
| 106a | Effect of wolf on elk. | Moon | Trees | Science |
| 106b | Effect of elk on plant life | Mars | Trees | Science |
| 106c | Effects of plant life on water flow | Venus | Trees | Science |
| 106d | Natural deposits | Mercury | Electrum | Science |
| 106e | Effect of mining on environment | Mercury | Iron | Science |
| 106f | Industrial processes to use natural deposits | Mercury | Iron | Society |
| 106g | Effects of mining on indigenous cultures | Venus | Iron | Society |

The content cards shown in FIG. 5 are only examples, and other content cards will be apparent to those who have skill in the art.

The game board 104 includes a domain region 200, a theme region 202, a background region 204, and a limbo region 206.

After the bead identifiers, symbols, and themes have been selected, and the content cards have been populated, the game may be played.

The game may have content cards 106 for a number of different domains and/or sub-domains. The game master, with optional consultation with consultation with the player(s), selects the domain or sub-domain to be explored, and the plurality of content cards 106 associated with such domain or sub-domain.

Typically, an image representation 208 of the selected domain is placed in the domain region 200. Further, the image representation 208 of the domain may include, for example, a map of the domain or another image of the domain. Further, in some embodiments, the image representation 208 of the domain may include one or more sections 210, 212, and 214 associated with sub-domains that may be explored by the game master and the player(s). The content developer may select the image representation 208, and the content developer may identify the sections 210, 212, and 214 as those sub-domains for which the content developer has populated content cards 106.

The theme region 202 is divided into four sub-regions 216, 218, 220, and 222, and each sub-region is associated with a theme. For example, the sub-regions 216, 218, 220, and 222 may be associated with the themes Science, Art, Society, and Religion, respectively.

A further image 224 associated with the domain may be placed in the background region 204 of the game board 104. If the domain is a place, the further image 224 may, for example, display the stellar constellations in the sky above the domain at the time of the year or the time-of-day when the game is being played. Other types of further images 224 that connect the domain with the time or place where the game is being played may be displayed in the background region 204.

Figure 1:
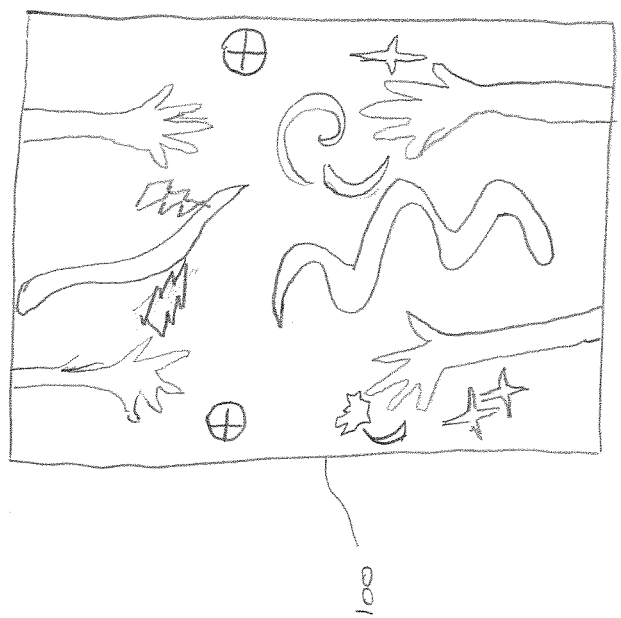
FIG. 1 is a top planar view of an explanation bearing member used in a game.

In some embodiments, to begin the game, the game master and each player place a particular bead, for example, the Saturn bead 108f, on the board. Other ways to indicate the start of a game apparent to one of skill in the art may be used. The game master then presents the explanation card 100 (FIG. 1). The explanation card 100 may be an abstract or concrete representation of the goal of the game. The game master and the players may discuss the explanation card 100 and what the contents of the explanation card 100 mean relative to the domain.

The game master may then present the background card 102 (FIG. 2) to provide the players with background information regarding the domain.

Thereafter, the game master places the Earth bead 108g thereof on the game board 104 to tune the game board 104. In some embodiments, to tune the game board 104, the game master, with optional consultation with the players, selects one or more symbol tokens 112 and places each selected symbol tokens 112 in the one of the sub-regions 216, 218, 220, and 222 of the game board 104. After the symbol tokens 112 have been placed, the game master removes the Earth bead 108g.

In other embodiments, symbol tokens 112 that are placed are preselected, for example, by the content developer, and the game board 104 is tuned by placing such preselected symbol tokens 112 on the game board 104.

Figure 4:
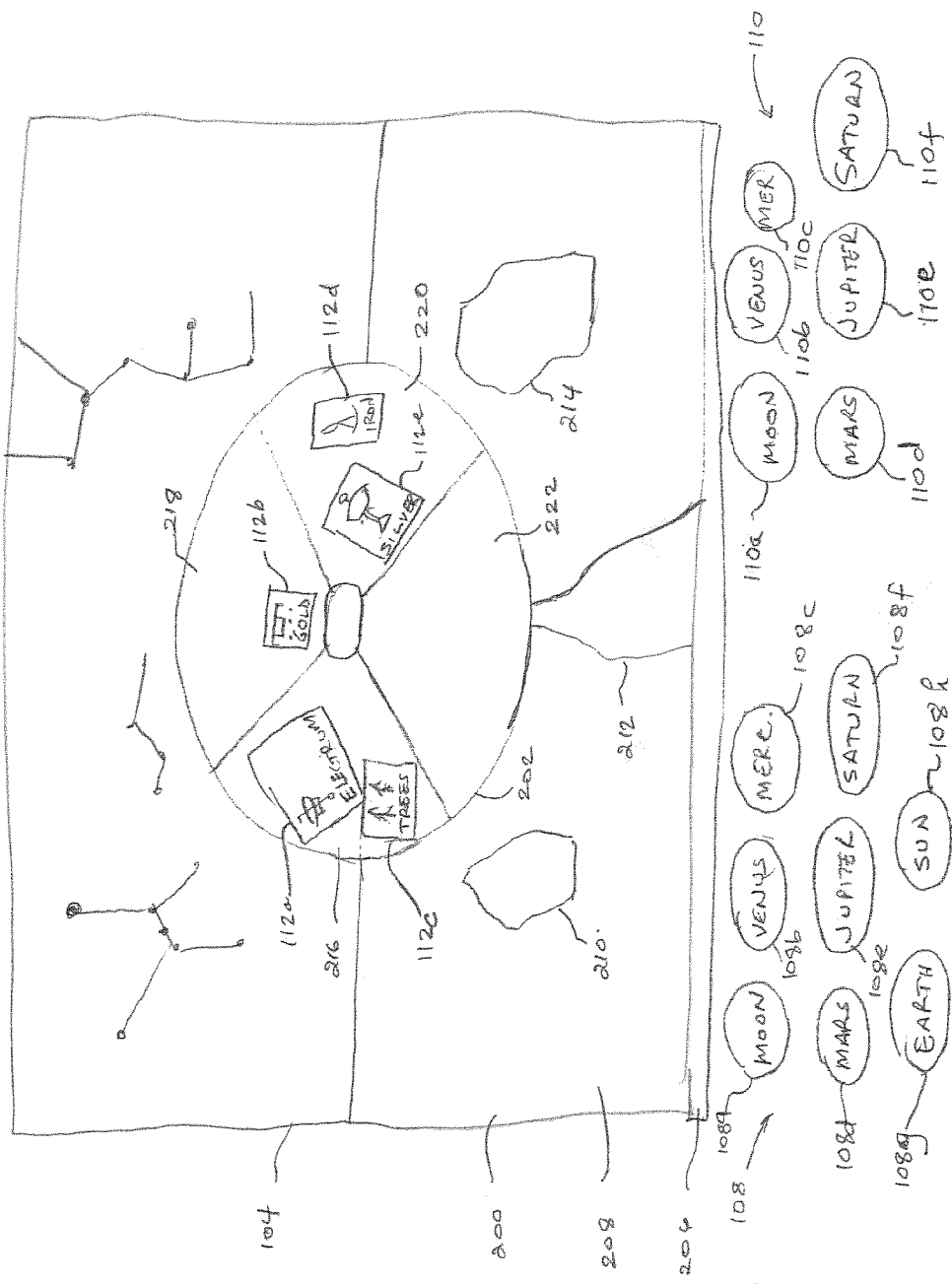
Figure 9:
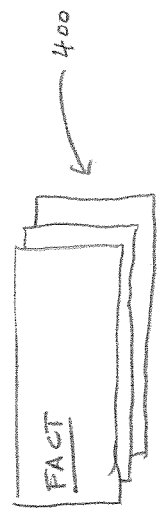
FIG. 9 is a top planar view of fact bearing members used in the game.

FIG. 3 shows the game board 104 before the game board 104 has been tuned and FIG. 4 shows the game board 104 after tuning. During tuning, the symbol tokens 112a (Electrum) and 112c (Trees) have been placed in the sub-region 216 associated with the theme Science, the symbol token 112b (Gold) has been placed in the sub-region 218 associated with the theme Art, and the symbol tokens 112d (Iron) and 112e (Silver) have been placed in the sub-region 220 associated with the theme Society.

After tuning the game board 104, the game master and the player(s) undertake bead play.

During bead play, each of the game master and the player(s) take turns. The game master selects one of the symbol tokens 112 on the game board, and one of her beads 110, other than the Saturn bead 110f, for play. The game master places the selected bead 110 on top of one of the symbol tokens 112 on the game board 204. The content card 106 that is associated with the combination of the identifier associated with the selected bead 108, the symbol associated with the selected symbol token 112, and the theme associated with the sub-region 216, 218, 220, or 222 where the symbol token 112 is placed, is selected. The information specified by selected content card 106 is presented to the game master and the player(s). Such information may be text and/or graphic imprinted on the selected content card 106. In some cases, the content card 106 may provide a reference (such the title of printed or electronic reference, a QR code, a bar code, a URL, and the like) from where the information may be retrieved. In some cases, the retrieved information may include textual, audio, image, and video content, or a combination thereof. In some embodiments, the game master and/or one of the players retrieve such information and presents the retrieved information to the other players. In other embodiments, each player may retrieve the information themselves. Other ways of specifying information on the content card 106 apparent to those who have skill in the art.

Thereafter, the game master then may move the selected bead 110 to a further symbol token 112 on the game board 204. Alternately the game master may move the selected bead 110 off the board.

If the game master moves the selected bead 110 to a further symbol token 112, a further content card 106 is selected in accordance the combination of the selected bead 110, the further symbol token 112, and theme associated with the sub-region 216, 218, 220, or 222 where the further symbol token 112 is placed. The information specified by the further content card 106 is presented to the game master and the player(s). The selected bead 110 is then moved off the board.

After the game master makes the moves described above, each player takes his turn. In particular, the selects one of his beads 108, other than the Saturn bead 110f, and places the selected bead 108 on one of the symbol tokens 112 on the game board 104. The content card 106 associated with the selected bead 108, the symbol token 112, and the theme associated with the sub-region where the symbol token 112 is placed is selected and presented to the game master and the other players. The player who is taking his turn may end his turn, or continue his turn and move the selected bead 108 to a further symbol token 112 to identify and present a further content card 106. If the player chooses to move the selected bead 108 to the further symbol token 112, the player's turn ends after the information specified by the further content card 106 is presented.

When the player's turn ends, the bead 108 or 110 that was played is moved off the game board 104, and such bead 108 or 110 is noted as being in "Limbo." In some embodiments, the beads 108 or 110 that are in Limbo may be placed in the limbo region 206. In other embodiments, beads 108 or 110 that are in Limbo are simply placed aside.

In some embodiments, a content card 106 associated with a bead 108 and 110 associated with a particular identifier, for example, the Jupiter bead 108e or 110e, may specify that the player who placed such bead or another player perform a duty before the information specified by such content card 106 may be presented to the game master and the players. Such duty may include, for example, answering one or more particular questions, explaining one ore more processes, undertaking one or more tasks, and the like. In addition, in some embodiments, such duty may require that the player answer one or more questions that test how well such player has understood the information presented during the game. The game master may evaluate the answers provided by the player or how well the player completed the duty and award the player one or more points.

The game master and the player(s) take turns as described above until one of the game master plays her Saturn bead 110f or one of the player(s) plays his Saturn bead 108f. To play the Saturn bead 108f or 110f, the game master or one of the players places such bead on the background region of the game board 104. Playing the Saturn bead 108f or 110f ends the bead play phase of the game and commences the explanation phase.

During the explanation phase, the game master and the player(s) discuss how the contents of the explanation card 100 are related to the information obtained during the bead play phase of the game. For example, the explanation card 100 may show two rivers, one that is relatively straight and another that has bends. The discussion during the explanation phase may discuss how mining and/or other human activity described in the information presented during bead play influences the flow of a river in the environment of the selected domain. The game master and the players may also discuss the meanings of symbols on the explanation card 100 and the like. Such discussion is an opportunity for the game master to present additional ideas to the players and/or an opportunity for reflection by the game master and players. In some embodiments, the game master or one of the players may end the explanation phase by placing a particular bead, for example, the Saturn bead 110f on the board.

Figure 7:
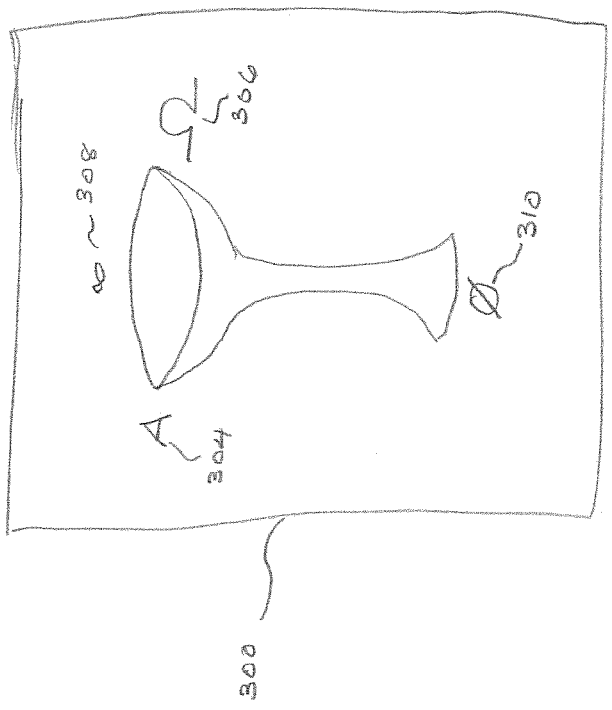
FIG. 7 is a top planar view of another board used in the game.
Figure 8:
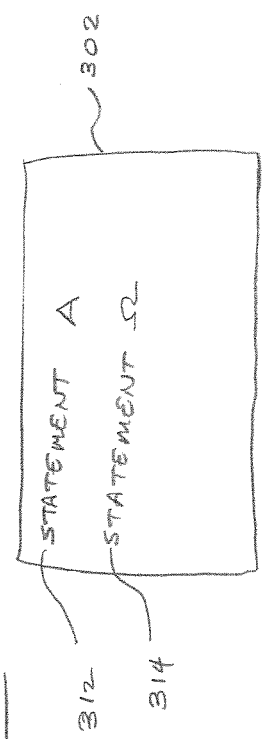
FIG. 8 is a top planar view of a statement bearing member used in the game.
Figure 12:
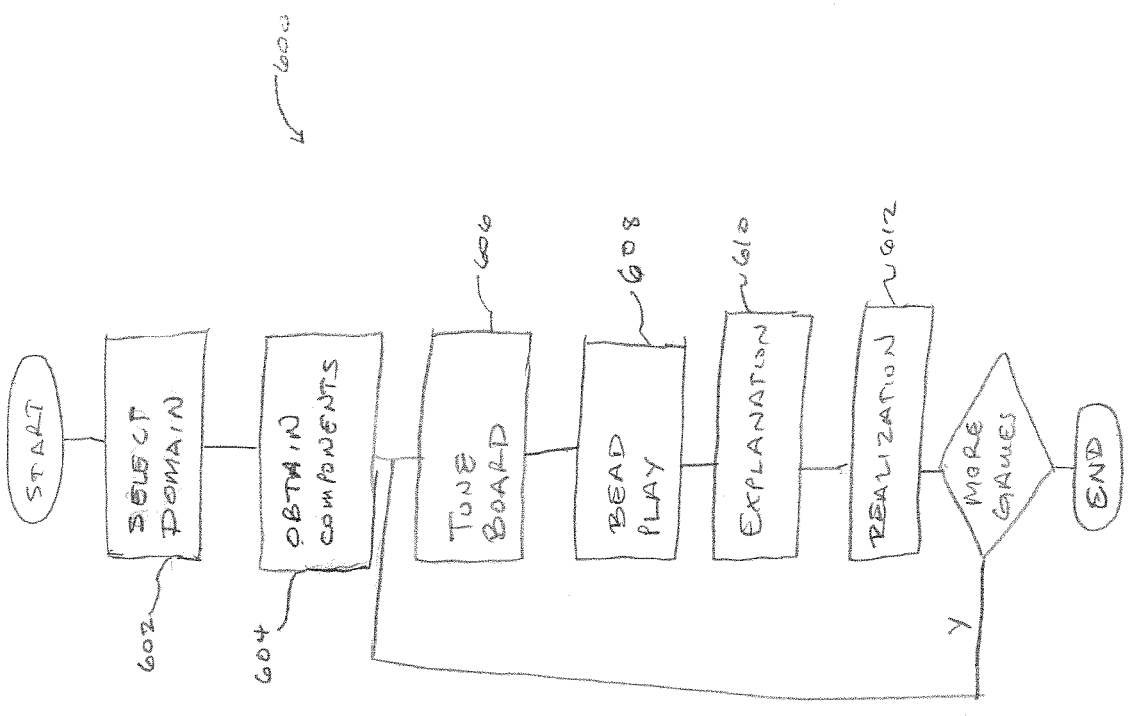
FIG. 12 is a flowchart that illustrates playing of the game.

Referring to FIGS. 7 and 8, after the explanation phase, a realization phase of the game may be undertaken in which a realization board 300 and a statement card 302 may be presented to the player(s). In one embodiment, the realization board 300 has an Alpha symbol 304, an Omega symbol 306, an Infinity symbol 308, and a Null symbol 310. The statement card has a statement 312 associated with the Alpha symbol 304 and a statement 314 associated with the Omega symbol 306. The content develop may populate the statement card 300 with the statements 312 and 314 to test the understanding of the domain gained by the players through game play. The content developer may populate the statement card 300 with statements 312 and 314 such that only one of the two statements 312 or 314 is correct, both statements 312 and 314 are correct, or neither statement 312 nor 314 is correct. Each player reviews the statements 312 and 314, and decides which, if any, of the statements 312 and/or 314 is correct. The player selects the Alpha symbol 304 if the player believes only the statement 312 is correct, selects the Omega symbol 306 if the player believes only the statement 314 is correct, selects the Infinity symbol 308 if the player believes both statements 312 and 314 are correct, and selects the Null symbol 310, if the player believes neither statement 312 nor 34 is correct.

The game master evaluates the selections made by each of the players. If the game master determines that the selection made by a player is correct, such player retrieve all of his beads 110 from Limbo. However, if the game master determines that the selection made by the player is incorrect, such player selects one of his beads 110 that is in Limbo and moves such bead from Limbo and to "Held." A bead 110 that is in Held is removed from the game and may not be available for play in a subsequent game.

In some embodiments, the content developer may populate fact cards 400. During the bead play phase of the game, a fact card 400 may be selected for each bead 108 or 110 that is in Limbo and presented to the player(s). Each fact card 400 specifies additional information either about the domain or another topic that is presented to the game master and the players. Such additional information may aid the player(s) in the discussion during the explanation phase or to evaluate the statements 312 and 314 during the realization phase.

Some embodiments of the game may include content cards 106 that specify information that is inconsistent with information specified by other content cards 106 or fact cards 400 presented earlier in the game. In such cases, the players may be rewarded with a point during for noticing such inconsistency or anomaly. Further, the game master may alert the players of an inconsistency if the players themselves do not identify such inconsistency.

After the realization phase is complete, each player that has earned points may use such points to retrieve his bead 110 from Held. In some embodiments, a player may need to use one point to move a bead 110 from Held to Limbo, and another point to move a bead from Limbo to Held. Further, the game master may place the Sun bead 108h on the board and retrieve from Held a bead 108 for one of the players. Similarly, one player may use points earned by him or her to help another player retrieve a bead 110 from Held or Limbo.

In some embodiments, certain beads, for example, the Venus beads 108b and 110b may have two or more parts. During the bead play phase of the game, such multi-part bead may be played as a unit (i.e., a single bead), or the multi-part bead may be split into sub-beads and each sub-bead may be placed on a different token symbol 112 on the board. The placement of each sub-bead is combined with the token symbol 112 and the theme region 216, 218, 220, and 222 where the token symbol 112 is placed, as described above, to identify one of content cards 106 and present the information specified by the identified content card 106.

Typically, the game described above is played multiple times with the same domain. For example, the game may be played in a triathlon in which the game is played three times without changing the domain. Any of a player's beads 108 placed in the limbo region 206 and not retrieved at the end of an individual game, may not be available to the player during subsequent games of the triathlon. Such beads 108 may be moved off of the board.

In some embodiments, the symbol tokens 112 may not be used. In such embodiments, the bead 108 is placed anywhere in one of the theme regions 216, 218, 220, or 222. The content card 106 associated with the placed bead 108 and the theme region 216, 218, 220, or 222 where the bead 108 is placed is selected, and information specified by the selected content card 106 is presented to the game master and the players.

The components of the game described above, for example, the explanation card 100, the background card 102, the game board 104, the content cards 106, the beads 108 and 110, the symbol tokens 112, the images 208 and 224, the realization board 300, the statement card 302, and the fact cards 400 may be manufactured from any suitable material including paper, cardboard, plastic, wood, a metal, and the like. Further, the different components may each be manufactured from different materials or combinations of materials. The multi-part beads 108b may be comprise pieces attached to one another in a separable manner, for example, using magnets, Velcro®, and the like.

It should be apparent to those who have skill in the art, that one or more of the components described above may be implemented completely or partially on a computer. Thus, for example, the "boards" may comprise a rendering of game board or realization board images on a display, the various "cards" may comprise entries in fields of a database stored in a computer, the "beads" and "tokens" may comprise a rendering on one or more images on a computer display, etc.

Referring to FIG. 10, in one embodiment, the game may be played using a computer-implemented system 500. Such computer-implemented system 500 may include a processor 502, a display 504, and one or more input devices 506. During the tuning phase of the game, the processor 502 may render the game board 104 on the display 504, and the available symbol tokens 112. The game master and/or the players may use the input device 506 to select and place the symbol tokens 112 on appropriate portions of the display in which the sub-regions 216, 218, 220, and 222 of the game board 104 are rendered.

The combinations of bead identifiers, themes, and token symbols used to select content cards 106, may be stored in a database 508a coupled to the computer 502. Alternately, such combinations may be stored in a database 508b coupled to another processor 510, and made available to the processor 502 over a network. The information presented on the explanation card 100, the background card 102, the content cards 106, the images 208 and 224, that statement card 302, and the fact cards 400 may also be stored in the database 508a and/or 508b and retrieved as needed by the processor 502 for display on the display 504.

The processor 502 may also render the beads 108 and 110 on the display. During bead play, the game master selects a rendition of the bead 108, or the player selects a rendition of the bead 110 associated therewith, on the display 504, and uses the input device to drag such rendition of the bead to a placed rendition of the symbol token 112.

The processor 502 detects such drag operation, and generates a database query that is used to select appropriate the content card 106 from the database 508a and/or 508b. The processor 502 then retrieves the information specified by the selected content card 106 and presents such information on the display 504.

Referring to FIG. 11, the processor 502 includes a game creation engine 520 that may be used by a content developer to populate entries in the database 508 associated with the information associated with the explanation card 100, the background card 102, the content cards 106, the images 208 and 224, that statement card 302, and the fact cards 400. For example, the entries for the content cards 106 may be represented as a table shown above that associates a particular bead identifier, symbol token, and theme with particular content. One of skill in the art would understand that such entries may be organized in the database so that the processor 502 may generate a query identifies a particular bead identifier, symbol token, and theme, and the such query selects the particular content associated therewith. It should be apparent, that such content may be textual information, image information, multimedia information, or a link to an external data source. Such external data source may be another database (e.g., the database 508*b*) or a web site hosted on server 522.

During game play, the game controller 526 selects content from the database 508 and provides such content to a game-rendering engine 524. The game-rendering engine 524 displays the content on the display 504. The game-rendering engine 524 receives from the input device 506 selections and movements from the game master or the player and supplies such input to the game controller 524. In response, the game controller 524 develops further content, for example by querying the database 508 as described above, and supplies such further content to the game-rendering engine 524 for display. It should be apparent to those who have skill in the art, that the game controller 524 may also keep track of beads 108 or 110 that are in the limbo region 206, points awarded to players, and the like.

When the game is played with a board 104 rendered on the display 504, the processor 502 may render additional content or animate content. For example, the processor 104 may determine the time-of-day when the game is being played and display in the background region 204 of the board 104 an image associated with such time-of-day and the domain. For example, if the domain is a location, the processor may display in the background region 204 a star chart of the constellations that are above such location. If the color of the start chart may be adjusted based on the time-of-day and/or weather conditions at the location when the game is being played. It should be apparent to those of skill in the art that such star chart information may be stored in the database 508 or may be retrieved from information sources on the Internet. Similarly, such weather information may be retrieved from weather information sources on the Internet.

For example, the processor 502 may display in the background image 204 white stars on a blue background if the game is played in the morning and the weather is sunny, white stars on a grey background if the game is played in the morning and the weather is cloudy, gray stars on an orange background if the game is played in the evening and the weather is sunny, and the like. In addition, the processor 520 may animate the representations of the beads 108 and 110, and/or regions of the board 104. Other ways of modifying how the game components are displayed apparent to those who have skill in the art.

In some embodiments of the game, one or more non-player participants may view the game. The game controller 526 may send content to a computer (not shown) operated by such a non-player participant. The non-player participant may, in some embodiments, be allowed to contribute additional information about the domain or ask questions about game play. Such communications from the non-player participant may be enabled by a text, audio, or video chat facility apparent to those who have skill in the art.

In some embodiments, the game master and/or the players may extend the game by for example creating additional explanation cards 100, content cards 106, symbol tokens 112, and the like. Such extensions may be stored in the database 508, for example, and noted with an identifier associated with the game master and/or player. A game with the extensions may be played by specifying to the game engine the identifier associated with the person who created the extensions.

The processor 502 may be a stand-alone computer or a processor of a tablet computer or mobile computer that also incorporates the display 504 and input device 506. Further, it should be apparent that the game master and players may be remote from one another, and receive content from the game controller 526 over a network connection. It should be apparent to those who have skill in the art that the game creation engine 520, the game rendering engine 524, and the game controller 526 may be implemented as computer executable code stored in a non-transitive storage medium. Further, the game creation engine 520, the game rendering engine 524, and the game controller 526 may be implemented using any programming language including Java, C, Objective C, JavaScript, and the like. Further, the rendering engine 524 may use any graphics-rendering framework including, for example, Direct X or OpenGL.

Referring to FIGS. 1-9 and 12, a flowchart 600 shows the steps of creating and playing the game described above. At block 602, a domain is selected.

At block 604, the explanation card 100, the background card 102, the content cards 106, the statement card 302, and the fact cards 400 associated with a particular domain are obtained. In some embodiments, such cards may have to be created by a content developer or a game master. Also at block 604, the image representation 208 of the selected domain may be placed in the domain region 200 and the further image 224 associated with the domain may be placed in the background region 204. The game master and the players may also review the explanation card 100 and the background card 102 associated with the domain. In some embodiments, the game master and/or the players may select, at block 604, one or more theme regions 216, 218, 220, and 222 on which beads may be played or on which symbol tokens 112 may be placed.

In some embodiments, there may be multiple explanation cards 100 associated with the domain, and the game master and/or the players may select, at block 604, one of the explanation cards 100 for a game. In some embodiments, a set of content cards 106 may be associated with each explanation card 100, and selecting the explanation card 100 to use in game also selects the content cards 106 to use during the game.

At block 606, the game board is tuned by selecting and placing one or more symbol tokens 112 in one or more theme regions 216, 218, 220, and 222 of the game board 204.

At block 608, the game master and the players take turns placing beads 108 and 110, and selecting a content card 106 determined by the placed bead 108 and 110, and presenting information specified by the selected content cards 106, as described above. Also, at block 608, one or more of the fact cards 400 may be presented to the players as described above. Such bead play continues until a bead 108*f* or 110*f* having a particular identifier, for example, the Saturn identifier associated therewith is placed.

Thereafter, at block 610, the explanation card 100 is reviewed once again, and, at block 612, the statement card 302 is presented to the players. As described above, each player states whether each statement presented on the statement card 302 is true or false. If game master determines that a player has assessed each statement on the statement card correctly, such player is awarded a point.

At block 614, a determination is made whether to play additional games using the same domain and if so, game play continues to block 606. Otherwise, game play ends.

INDUSTRIAL APPLICABILITY

In summary, a game board, beads, and content may be used to play a game that can teach players about a domain.

The content may be provided from different aspects of the domain and allow players to use different thinking skills to add to their understanding of the domain.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. It should be understood that the illustrated embodiments are exemplary only, and should not be taken as limiting the scope of the disclosure.

I claim:

1. A game, comprising:
    a board, wherein the board has a domain region and a plurality of theme regions, and each theme region is associated with a theme;
    a plurality of game pieces for each player, wherein each one of the plurality of game pieces is associated with a game piece identifier;
    a plurality of information bearing members, wherein each of the plurality of information bearing members is associated with a theme and a game piece identifier; and
    wherein placing one of the plurality of game pieces in a theme region selected from the plurality of theme regions causes selection of one of the plurality of information bearing members in accordance with the game piece identifier associated with the placed game piece and the theme associated with the theme region in which such game piece is placed, and wherein information specified by the selected information bearing member is presented to all of the players.

2. The game of claim 1, further comprising a plurality of symbol tokens, wherein one of the plurality of symbol tokens is placed in one of the plurality of theme regions.

3. The game of claim 2, wherein the game piece is placed on the symbol token, and one of the plurality of information bearing members is selected in accordance with the game piece identifier associated with the placed game piece, the symbol token where the game piece is placed, and the theme associated with theme region in which the symbol token is placed.

4. The game of claim 1, wherein information specified by the selected information bearing member is associated with the domain.

5. The game of claim 1, wherein the board includes a background region, and the contents of the background region are selected in accordance with the domain.

6. The game of claim 1, wherein the information presented to the players includes at least one of textual content, video content, aural content, and image content.

7. The game of claim 1, wherein the plurality of information bearing members is associated with a first domain and a further plurality of information bearing members is associated with a second domain, wherein the player may select either the plurality of information bearing members or the further plurality of information bearing members with which to play the game.

8. The game of claim 1, wherein the board is rendered on a computer display.

9. The game of claim 7, wherein the information bearing members are associated with entries in a database.

10. The game of claim 1, wherein one of the pluralities of game pieces may be separated in to two sections, and each section may be placed in a different theme region.

11. The game of claim 1, wherein placement of selected game pieces of the plurality of game pieces and selection of corresponding information members of the plurality information members is repeated and comprises a bead-playing phase of the game, and wherein placing one of the plurality of game pieces that has a particular game piece identifier associated therewith ends the bead-playing phase of the game and commences an explanation phase of the game during which information specified by the selected ones of the plurality of information members is analyzed.

12. A method of playing a game, comprising:
    providing a board, wherein the board has a domain region and a plurality of theme regions, and each theme region is associated with a theme;
    providing a plurality of game pieces to each player, wherein a game piece identifier is associated with each game piece of the plurality of game pieces;
    associating each one of a plurality of information bearing members with a theme and a game piece identifier;
    placing one of the plurality of game pieces in a theme region selected from the plurality of theme regions;
    selecting one of the plurality of information bearing members in accordance with the game piece identifier associated with the placed game piece and the theme associated with the theme region in which such game piece was placed; and
    presenting information specified by the selected information bearing member to players of the game.

13. The method of claim 12, comprising the further steps of placing one of a plurality of symbol tokens in one of the plurality of theme regions.

14. The method of claim 13, wherein the step of placing one of plurality of game pieces comprises the step of placing one of the game piece on the placed symbol token, and the step of selecting one of the plurality of information bearing members comprises the step of selecting one of the plurality of information bearing members in accordance with the game piece identifier associated with the placed game piece, the symbol token on which the game piece is placed, and the theme associated with theme region in which the symbol token is placed.

15. The method of claim 12, wherein contents of the selected information bearing member is associated with the domain.

16. The method of claim 12, wherein the board includes a background region, and the contents of the background region are selected in accordance with the domain.

17. The method of claim 12, wherein step of presenting the information includes presenting at least one of textual content, video content, aural content, and image content.

18. The method of claim 12, comprising the step of selecting a domain and selecting a plurality of information bearing members associated with the domain.

19. The method of claim 12, comprising the further step of rendering the board on a display associated with a computer.

20. The method of claim 19, comprising the further step of storing the plurality of information bearing members as a plurality of entries in a database.

21. The method of claim 12, comprising the steps of separating one of the game pieces into two sections, and placing each section in a different theme region.

22. The method of claim 12, comprising undertaking a bead-play phase of the game during which the steps of placing one of the plurality of game pieces and selecting one of the information bearing members are repeated, further including the steps of ending a bead-play phase of the game by placing one of the plurality of game pieces that has a particular game piece identifier associated therewith on the board, thereafter commencing an explanatory phase of the game during which information from the selected information bearing members is analyzed.

* * * * *